United States Patent [19]

Lewicki et al.

[11] 3,775,570

[45] Nov. 27, 1973

[54] MAGNETO-OPTIC DETECTION SYSTEM WITH NOISE CANCELLATION

[75] Inventors: George W. Lewicki, Studio City; John E. Guisinger, Altadena, both of Calif.

[73] Assignee: California Institute of Technology, Pasadena, Calif.

[22] Filed: Feb. 25, 1972

[21] Appl. No.: 229,287

[52] U.S. Cl.............179/100.2 CH, 340/174 YC, 340/174.1 M; 350/151

[51] Int. Cl. .......................................... G11b 11/10

[58] Field of Search......... 179/100.2 CH, 100.2 CR; 340/174.1 M, 174 YC; 350/151

[56] References Cited

UNITED STATES PATENTS

| | | | |
|---|---|---|---|
| 3,268,879 | 8/1966 | Lins | 340/174.1 M |
| 3,491,351 | 1/1970 | Smaller et al. | 340/174.1 M |
| 3,626,114 | 12/1971 | Lewicki | 179/100.2 CH |

*Primary Examiner*—Bernard Konick
*Assistant Examiner*—Robert S. Tupper
*Attorney*—Samuel Lindenberg et al.

[57] ABSTRACT

In a magneto-optic readout system, a polarized beam of light from a laser is subjected to the magneto-optic effect of a magnetic record medium, and then passed through an analyzer which resolves the beam into two orthogonal vector components so oriented that the two components are of equal amplitude when the angle of rotation due to the magneto-optic effect is zero. Separate photodetectors produce two output signals which are proportional to the amplitudes of the vector components. The two output signals are combined in a differential amplifier through separate logarithmic transfer circuits to produce an output signal proportional to the ratio of the two original detector signals.

6 Claims, 2 Drawing Figures

MAGNETO-OPTIC DETECTION SYSTEM WITH NOISE CANCELLATION

ORIGIN OF THE INVENTION

The invention described herein was made in the performance of work under a NASA contract and is subject to the provisions of Section 305 of the national aeronautics and space act of 1958, public law 85-568 (72 sta. 435; 42 U.S.C. 2457).

BACKGROUND OF THE INVENTION

This invention relates to a magneto-optic detection system for non-destructively detecting the state of magnetization of a record medium, and more particularly to a magneto-optic readout system.

In both digital and analog readout of information stored in a record medium, such as a thin magnetic film, a polarized beam of light is used to detect the sense and magnitude of magnetization present in the record medium. In a system utilizing the longitudinal Kerr effect, the beam of light is reflected by the surface of the record medium. In the process of reflecting the polarized beam, the record medium rotates the polarized beam in a direction corresponding to the sense of magnetization. The degree of rotation is proportional to the amplitude of the magnetization being detected. In a system utilizing the transverse Faraday effect, the beam of polarized light is transmitted through the record medium, and in the process the direction of polarization is rotated. Both types of effects are generally referred to hereinafter as magneto-optic effects because in each case the information stored in the record medium is transferred to the polarized beam essentially as a change in the direction of polarization.

This change in direction may be detected by passing the beam through an analyzer, such as a Glan-Thompson prism which splits the beam into two components, one with an intensity $I \cos^2 (\theta+\phi)$ and the other with an intensity $I \sin^2 (\theta+\phi)$, where I is the intensity of the polarized beam, $\phi$ is the angle of rotation produced by the magneto-optic effect of the record medium on the polarized beam, and $\theta$ is the angle of rotation of the analyzer from its position of minimum transmittance. The angle $\phi$ is usually very small, of the order of four degrees maximum in either direction. Consequently, any fluctuation in the intensity I of the light source will appear as a modulation on the components $I \cos^2 (\theta+\phi)$ and $I \sin^2 (\theta+\phi)$. If only one component is detected to produce an output signal, the fluctuations of intensity will appear on the output signal as noise. Additional noise may be introduced in the photodetector such as when a photomultiplier tube is used and the high voltage power supply fluctuates to change the gain of the light detector.

To increase the signal-to-noise ratio, it has been previously proposed that each of the components $I \cos^2 \theta$ and $I \sin^2 \theta$ be detected separately and that the resulting signals be combined in a differential amplifier. However, that differential technique eliminates from the output signal only so much of the amplitude modulation caused by fluctuation of light intensity as is common to both components. The same is true of noise due to fluctuations in gain common to both detectors. If the angle $\theta$ is selected to be about 45° it can be seen that the components will be approximately equal, but complete cancellation of noise will be achieved only for the condition of no information, i.e. for the condition of the angle $\phi$ at zero. The greater the angle $\phi$, the greater the information signal and the greater the noise. Therefore, it is evident that the resulting signal-to-noise ratio is not constant, but rather a function $\cos^2 (\theta+\phi) - \sin^2 (\theta+\phi)$. It would be desirable to achieve a maximum signal-to-noise ratio throughout the full range of the angle $\phi$.

SUMMARY OF THE INVENTION

An improved magneto-optic detection system is achieved in accordance with the present invention by passing a polarized beam of light, which has been subjected to the magneto-optic effect of a megnetic record medium, through an analyzer that is oriented to resolve the beam into two orthogonal components $I \sin^2 (\theta+\phi)$ and $I \cos^2 (\theta+\phi)$ of equal amplitude when the magneto-optic angle $\phi$ is zero. The two components $I \sin^2 (\theta+\phi)$ and $I \cos^2 (\theta+\phi)$ of the beam are separately detected to produce signals proportional to their amplitudes and then transmitted through separate logarithmic transfer circuits to a differential amplifier where they are combined to produce a long-difference signal proportional to a ratio of one component to the other thereby cancelling fluctuations in the magnitude of I due to fluctuations in the intensity of the light source, or the gain of the detectors to the extent the gain fluctuates in both detectors together in the same direction.

DESCRIPTION OF THE PREFERRED EMBODIMENTS

Figures 1, 2:
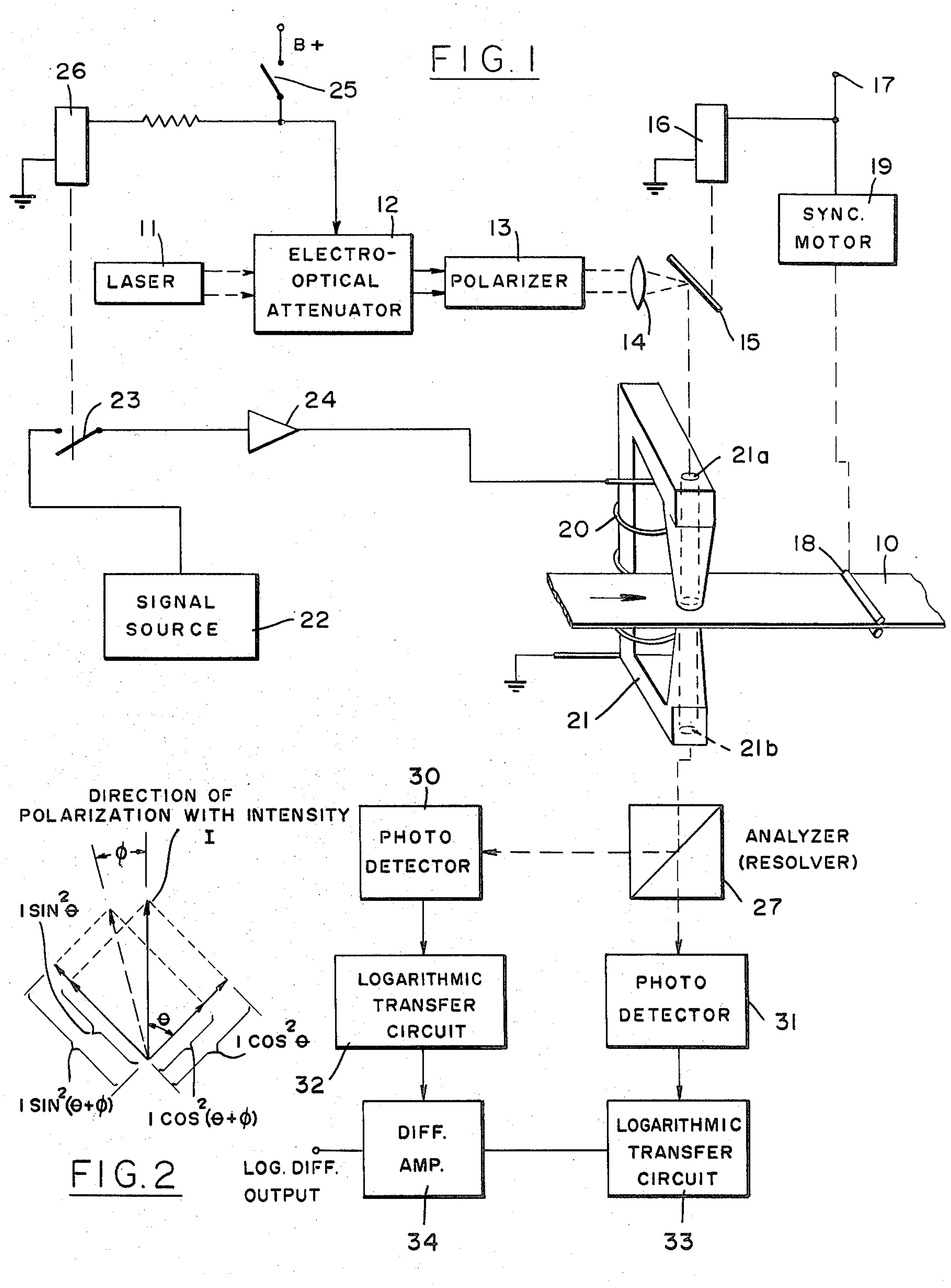
FIG. 1 is a functional block diagram of the present invention and FIG. 2 is a vector diagram useful in understanding the present invention.

In an exemplary embodiment of the present invention shown in FIG. 1, magneto-optic detection of high-density analog recording is provided using the Faraday effect. By proper modification of the optics, detection could be provided in a strictly analogous manner using the Kerr effect, i.e., using a beam of light reflected by the magnetic medium instead of a beam of light transmitted through the magnetic medium.

The information to be read out of the magnetic medium, a thin film 10, is recorded in a manner more fully described in U.S. Pat. NO. 3,626,114. Briefly, the thin film 10 of suitable magnetic material such as manganese bismuthide (MnBi), is heated to its Curie point by a beam of light from a laser 11 transmitted through an energized electro-optical attenuator 12, such as a Pockels cell.

A polarizer 13 is provided to polarize the monochromatic light transmitted by the laser 11 through the attenuator 12, but it should be understood that the polarizer 13 is required only for magneto-optical readout. The polarized monochromatic light beam is focused by a lens 14 onto a beam deflecting means, such as a mirror 15 vibrated by a solenoid 16. The solenoid is driven by a sinusoidal signal of approximately 75 Hz applied at a terminal 17. In that manner the film is scanned laterally with a high intensity narrow beam while the film is moved longitudinally for the purpose of heating it to its Curie point. The solenoid 16 may be a dynamic loudspeaker driver with a mechanical drive connection from the armature thereof to the mirror, and the film is moved longitudinally by a mechanism 18 drive by a synchronous motor 19 connected to the terminal 17.

A coil 20 on a C-core is energized by an input signal to be recorded. That signal is received from a source 22 through a switch 23 and an amplifier 24. It is applied to the coil 20 to provide a magnetic field perpendicular to the film with a polarity determined by its polarity and a magnitude proportional to its amplitude. As the film is heated by the laser beam, the magneto-optic density will vary in the heated area as a function of the magnetic field. In that manner the magneto-optic density varies as a function of the applied signal as long as the recording system is not saturated, i.e., as long as the magnetic field is not increased beyond a point of producing a maximum magneto-optic density.

The C-core is preferably cast out of ferromagnetic material with truncated cone tips. Suitable holes 21*a* and 21*b* are cast or drilled with a diameter of about 10 mils. That diameter sets the maximum length of each lateral scan cycle. The lower hole 21*b* is required only for passing light transmitted through the film while reading out recorded information.

To read out recorded information, the attenuator 12 is de-energized by opening a record-playback control switch 25. At the same time a solenoid 26 is de-energized, that allows the switch 23 to open. In that manner the input signal source 22 is disconnected from the amplifier 24 to remove the applied magnetic field.

De-energizing the attenuator 12 causes the light transmitted to the polarizer 13 to be decreased to a selected level below that needed to heat the film to its Curie point. That level is selected to be sufficient for light transmitted through the film to be analyzed with respect to the magneto-optic effect produced on it by the information recorded i.e., analyzed with respect to the angle $\phi$ that the direction of polarization is rotated by the magnetic field of the recorded information.

During readout, an analyzer 27 is employed to resolve the beam of polarized light transmitted through the film into two orthogonal vector components which are of equal amplitude when there is no recorded information, i.e., when the angle $\phi$ is zero. The two components are shown in FIG. 2 by the two vectors $I \cos^2 \theta$ and $I \sin^2 \theta$ when the angle $\theta$ is zero. The up-right vector relates to the electric field of the beam received by the analyzer. Since power propagation in the light is proportional to the square of the electric field vectors, the signals derived from the components are functions of $\cos^2 \theta$ and $\sin^2 \theta$. When the direction polarization is rotated through an angle $\phi$ to the dotted line position, the two detected components are as represented by the two vectors $I \cos^2 (\theta+\phi)$ and $I \sin^2 (\theta+\phi)$. The change in amplitude of either component is a function of the angle $\phi$, and therefore, proportional to the information recorded.

For greater sensitivity, the difference between the two components may be produced as the output signal, but for greater signal-to-noise ratio, the amplitude of the two components detected by photodetectors 30 and 31 are coupled by logarithmic transfer circuits 32 and 33 to a differential amplifier 34. The output of the differential amplifier is then the logarithmic difference between the two detector signals. That logarithmic difference is obviously proportional to the ratio of the component signals. The true ratio may be obtained easily by taking the antilogarithm of the difference output. Both antilogarithm and logarithmic transfer circuits are known and commercially available. See for example U. S. Pat. Nos. 3,293,450 and 3,255,360.

To better appreciate how this logarithmic difference increases the signal to noise ratio, consider the effect of an increase in the intensity I of the light source. When the magneto-optic effect angle $\theta$ is zero, both of the vector components $I \cos^2 \theta$ and $I \sin^2 \theta$ increase by the same amount because $\theta$ is equal to 45° and the sine and cosine of 45° are both equal to 0.707. For that condition the simple arithmetic difference will provide complete cancellation of noise due to fluctuation in the intensity of the light source because the difference would still be zero. When the direction of polarization has been rotated through an angle $\phi$, the simple arithmetic difference will not provide complete cancellation of noise because the sine and cosine of $(45° + \phi)$ are not equal.

Consider that if the change in the light intensity is equal to some finite value $\Delta I$, the change in amplitude of one vector component is $\Delta I \cos^2 (\theta+\phi)$ while the change in the amplitude of the other vector component is $\Delta I \sin^2 (\theta+\phi)$. Since the sine and cosine functions of $(\theta+\phi)$ are not equal, except for $\theta$ equal to 45° and $\phi$ equal to zero, the simple arithmetic difference will not, as just stated, provide complete cancellation of noise, but the logarithmic difference will. This is so because, for every magneto-optic angle $\phi$, the ratio of $I \cos^2 (\theta+\phi)$ to $I \sin^2 (\theta+\phi)$ is obviously constant for all values of intensity I. Therefore, the logarithm of the ratio, which is the logarithmic difference output of the differential amplifier, must also be constant for all values of intensity I.

The intensity I has been defined as the actual intensity of the light source, but may also be the effective intensity which can fluctuate if the gain of the two photodetectors 31 and 32 are subject to the same fluctuations. Such a condition may exist for example, when the two photodetectors 31 and 32 are photomultiplier tubes having a common high-voltage power supply. Any fluctuation in that power supply will produce a fluctuation in gain. The resulting noise in the output signal is cancelled by this logarithmic difference technique to the extent it appears as an apparent fluctuation of the intensity I in the two components $I \cos^2 (\theta+\phi)$ and $I \sin^2 (\theta+\phi)$.

From the foregoing it is evident that the present invention is not limited to cancellation of fluctuations in the light source, although light source fluctuation is the most probable cause of noise. This is particularly true when a gas laser is used. The output of a gas laser is characterized by random low-frequency fluctuations which greatly reduce the accuracy of magneto-optic detection of recorded information, particularly of analog recorded information wherein all signal levels are recorded between two extremes of opposite polarities, as opposed to binary recorded information wherein the signal levels recorded are usually at the extremes of opposite polarities. The gain of the photodetectors can, on the other hand, be stabilized by proper circuit design.

Although a particular embodiment of the invention has been described and illustrated herein, it is recognized that modifications and variations may readily occur to those skilled in the art, such as the use of an half-silvered mirror as a beam splitter in the position of the analyzer 27, and a separate analyzer in front of each of the photodetectors 30–31, thereby accomplishing in two steps what the analyzer does in one. Consequently, it is intended that the claims be interpreted to cover such modifications and variations.

What is claimed is:

1. A magneto-optic detection system for quantitatively determining the magnetic state of a record medium capable of assuming a stable magnetic state comprised of:

means for producing a polarized beam of light, means for directing said polarized beam onto said medium to subject said polarized beam to the magneto-optic effect of said medium, whereby the direction of polarization of said beam is rotated by the magnetic field of said medium in that area onto which said beam is directed, to produce a rotated beam, said rotation being in a direction corresponding to the polarity of the magnetic state of said medium in said area, and the amount of rotation being proportional to the magnitude of the magnetic field in said area of said medium, means for effectively resolving said rotated beam into two orthogonal vector components, said resolving means being oriented to resolve said polarized beam into equal components when said polarized beam is not rotated by said medium, whereby components of said rotated beam are functions of the sine and cosine of the angle of rotation of said beam produced by said magneto-optic effect, separate photodetection means for detecting the amplitude of said two components of light and producing two component signals proportional to the amplitudes of said two components, means responsive to one of said component signals for obtaining a first signal proportional to the logarithm of the amplitude thereof, means responsive to the other of said component signals for obtaining a second signal proportional to the logarithm of the amplitude thereof, and means for differentially combining said first and second signals to obtain an output signal proportional to the difference between said first and second signals.

2. A magneto-optic detection system as defined in claim 1 wherein said means for producing a polarized beam of light is comprised of a laser and a polarizer.

3. A magneto-optic detection system as defined in claim 2 wherein said differentially combining means is comprised of means for amplifying the difference between said first and second signals.

4. A Faraday magneto-optic detection system for quantitatively determining the magnetic state of thin film magnetic record medium capable of assuming any magnetic state between two extremes of opposite polarities comprised of:

means for producing a beam of polarized light, means for transmitting said beam of polarized light through said record medium, whereby the direction of polarization of said beam is rotated by the magnetic field of said record medium in that area of said record medium through which the beam is being transmitted to produce a rotation beam, the sense of rotation corresponding to the polarity of the magnetic state of said record medium in said area, and the amount of rotation being proportional to the magnitude of the magnetic field in said area, means for effectively resolving said rotated beam into two orthogonal vecotr components, said means being oriented to resolve said polarized beam into equal components when said polarized beam is not rotated by said medium, whereby components of said rotated beam are functions of the sine and cosine of the angle of rotation of said beam produced by said magneto-optic effect, separate photodetection means for detecting the amplitude of said two components of light and producing two component signals proportional to the amplitudes of said two components, means responsive to one of said component signals for obtaining a first signal proportional to the logarithm of the amplitude thereof, means responsive to the other of said component signals for obtaining a second signal proportional to the logarithm of the amplitude thereof, and means for differentially combining said first and second signals to obtain an output signal proportional to the difference between said first and second signals.

5. A magneto-optic detection system as defined in claim 4 wherein said means for producing a polarized beam of light is comprised of a laser and a polarizer.

6. A magneto-optic detection system as defined in claim 5 wherein said differentially combining means is comprised of means for amplifying the difference between said first and second signals.

* * * * *